United States Patent [19]

Kurobe et al.

[11] 3,967,045

[45] June 29, 1976

[54] PRE-COATED METAL SHEET

[75] Inventors: Moriji Kurobe; Toshimi Araga; Nobuhiro Ito, all of Nagoya; Shigeyuki Sato, Iwakura; Hidero Takahashi, Nagoya, all of Japan

[73] Assignee: Kabushiki Kaisha Toyota Chuo Kenkyusho, Japan

[22] Filed: July 3, 1974

[21] Appl. No.: 485,592

[30] Foreign Application Priority Data

July 5, 1973  Japan.............................. 48-76277

[52] U.S. Cl. .............................. 428/463; 260/836; 260/887; 260/900; 260/901; 427/327; 427/388; 427/420; 427/428; 428/461; 428/465

[51] Int. Cl.².................... B32B 15/08; B32B 27/30

[58] Field of Search .................. 117/161 A, 132 B; 260/887, 900, 901, 836; 428/461, 463, 465

[56] References Cited

UNITED STATES PATENTS

| | | | |
|---|---|---|---|
| 2,904,526 | 9/1959 | Uelzmann...................... | 260/901 X |
| 2,947,716 | 8/1960 | Cornell et al................... | 260/901 X |
| 2,994,676 | 8/1961 | Kucsan et al................... | 260/898 X |
| 3,236,914 | 2/1966 | Murdock et al................ | 260/901 X |
| 3,311,583 | 3/1967 | Bearden........................... | 117/132 B |
| 3,445,544 | 5/1969 | Schmitt............................ | 260/901 X |
| 3,551,374 | 12/1970 | Reinhard et al................. | 260/901 X |
| 3,658,947 | 4/1972 | Ito et al. .......................... | 260/887 |
| 3,719,521 | 3/1973 | Johnson et al.................. | 117/161 A |
| 3,856,883 | 12/1974 | Dickie et al. ...................... | 260/836 |

*Primary Examiner*—Harry J. Gwinnell
*Attorney, Agent, or Firm*—Oblon, Fisher, Spivak, McClelland & Maier

[57] ABSTRACT

A pre-coated metal sheet is prepared by coating a metal sheet with an acrylic resin comprising a dispersion of a granular rubbery material in an acrylic-based resin matrix which acrylic-based resin matrix contains monomer units having functional groups which crosslink upon heating.

7 Claims, 1 Drawing Figure

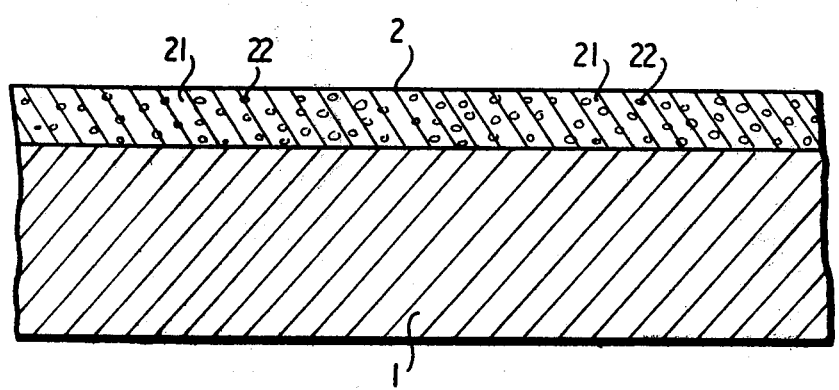

PRE-COATED METAL SHEET

BACKGROUND OF THE INVENTION

1. Field of the Invention:

This invention relates to an acrylic resin-pre-coated metal having excellent workability at room temperature. This invention further relates to an acrylic resin coating layer having minimum strain and high surface hardness resulting from heat treatment subsequent to working of the metal.

2. Description of the Prior Art:

Hitherto, pre-coated metal sheets have found wide use in industry. Pre-coated metal sheets have been prepared by surface coating steel, zinc-plated steel, aluminum and the like either in coil or cut-sheet form with a coating material or laminated with a synthetic resin flim. After the coating process, the metal sheets have been subjected to plastic working, such as press forming, with the aforesaid coated or laminated surfaces being left intact. The sheets require no further coating for protection or decoration of the surfaces of the metal sheets. Recently, pre-coated metal sheets have found wide use in the sheet-forming industry, because of their attractive advantages, such as elimination of a coating step which saves manpower.

Known pre-coated metal sheets may be generally classified into two types: those having a hardened or set layer composed of a thermosetting acrylic resin and those having a plasticized resin-coated layer composed of soft polyvinyl chloride. The former type has the advantage that the surface is extremely hard and resistant to scratches, but suffers from the disadvantage of brittleness and poor workability. On the other hand, the latter type has the advantage of satisfactory workability to the same degree as that of the base metal sheet, but suffers from the disadvantage of scratching. Additional disadvantages experienced with both types of pre-coated metal sheets include residual working strain in the resin-coated layers, low resistance to chemicals and poor weatherability. In other words, conventional pre-coated metal sheets fail to provide sufficient workability for satisfactory tight or contact-bending, sufficient hardness of at least as high as 4 H pencil core hardness and sufficient residual working strain in the resin-coated surfaces of the final products.

A need exists therefore for a pre-coated metal sheet which will overcome the above disadvantages of prior art sheets.

SUMMARY OF THE INVENTION

Accordingly, one object of the invention is to provide a resin-coated metal sheet with improved workability.

Another object of the invention is to provide a resin-coated metal sheet with improved hardness.

A further object of the invention is to provide a resin-coated metal sheet with a coating containing little or no residual working strain.

Still another object of the invention is to provide a resin coated metal sheet which is resistant to chemicals and weather.

These and other objects of the invention as well hereinafter become more readily understood have been attained by a coating layer composed of an acrylic based resin, which is glass-like at room temperature, and a dispersive portion of a granular rubbery material, which is rubbery at room temperature. The coating is mainly composed layer of monomeric units containing a functional group which is adapted to cross-linking upon heating.

BRIEF DESCRIPTION OF THE DRAWINGS:

A more complete appreciation of the invention and many of the attendant advantages thereof will be readily obtained as the same becomes better understood by reference to the following detailed description when considered in connection with the accompanying drawing, wherein:

The FIGURE is an enlarged cross sectional view of the pre-coated metal according to the present invention wherein 1 is a metal sheet, 2 is a coating resin layer, 21 is a glassy acrylic based resin matrix and 22 is a granular rubbery dispersive material.

DETAILED DESCRIPTION OF THE PREFERRED EMBODIMENTS:

The pre-coated metal of the invention, as shown in an enlarged view of the accompanying drawings, is composed of a metal sheet 1 and a resin coated layer 2 which is applied at least to one surface of the metal sheet 1. The resin coated layer 2 contains a matrix portion 21 of a glassy acrylic-based resin and a dispersive portion 22 of a granular rubbery material. This coated layer affords superior workability, and a highly stabilized and hard surface layer, which is free of residual strain, such as in molecular orientation, compared to conventional thermosetting pre-coated metal sheets. These superior properties may be obtained merely by subjecting the sheet to treatment subsequent to the working step. Such heat treatment requires no additional manpower and is rather easily automated.

As has been described above, the resin coated layer of the present invention has a structure composed of a matrix portion of an acrylic based resin which is glassy at room temperature (hereafter referred to as acrylic-based resin) and a dispersive portion composed of a granular rubbery material, which is a rubbery at room temperature (hereafter referred to as rubbery material). The layer is mainly composed of resin compositions containing monomeric units with a functional group which tends to cause crosslinking upon heating. The structure of the aforesaid resin coated layer, which contains granular rubbery materials dispersed in a glassy matrix, permits a high degree of plastic deformation. In addition, a strong coated layer will result because the matrix portion of the resin-coated layer is composed of a strong acrylic-based resin and the strength of the coated layer is substantially equal to that of the matrix portion. The pre-coated metal sheets of the present invention will withstand breakage or cuts in the coated layer resulting from excessively large application of pressure at the time of working, and will withstand a high degree of deformation, that is the sheets provide excellent workability. The thickness of the resin coated layer may vary depending on the extent of intended plastic working, the desired appearance and corrosion resistance required, and is preferably 20 $\mu$ to 200 $\mu$.

The amount of acrylic-based resin and rubbery material in the resin compositions, are preferably between 70 and 99% by weight and between 1 to 30% by weight, respectively. If the amount of acrylic-based resin is less than 70% or the amount of rubbery material is in excess of 30%, an unstable matrix results, coupled with lowered strength and higher degree of deformation, which leads to lowered workability and decreased surface hardness of the final product. On the other hand, if the proportion of acrylic-based resin is in excess of 99% or the proportion of rubbery material is no more than 1%, that is, an excessively small amount of dispersive portion, a sharp or radical decrease in the degree of deformation will result along with poor workability. The most preferable proportions of acrylic-based resin and rubbery material are from 80% to 97% and from 3% to 20%, respectively.

The particle size of the rubbery material of the resin of the invention also largely affects the toughness of the coated layer. The most preferable particle size diameter for the dispersive portion is $0.05\mu$ to $15\mu$. Thus, an excessively large or small particle size, outside of the above range, will result in lowered strength or in elongation of the resin, with a resulting loss of durability.

The monomeric units included in the resin and adapted to cause cross-linking upon heating subsequent to plastic working to a desired shape of the precoated metal of the present invention, act by cross-linking to each other so as to suppress molecular motion. This cross-linking increases the resistance to deformation of the resin, i.e., the increase in hardness of the coated layer or in surface hardness of the final product. The monomeric units containing the cross-linking functional group should be dispersed uniformly throughout the entire resin composition. However, even when the monomeric units are present only in the matrix portion, the above advantageous effects will result. The amount of monomeric units containing the functional group is preferably 1 to 30% by weight, based on the matrix portion of acrylic-based resin. The above proportion will produce 0.5 to 15 cross-linkages per 100 monomeric units. Fewer than 0.5 cross-linkages per 100 monomeric units will fail to suppress the molecular motion to a sufficient degree, and will provide a minimal resin-setting effect. On the other hand, if the number of cross linkages is greater than 15, the acryl resin will become too great, and no suppression of molecular motion and no improvement in hardness of the resin will result.

Suitable acrylic-based resins include 50 to 99% lower alkyl methacrylates, such as methyl methacrylate, and lower alkyl acrylates, from 0 to 49% of a vinyl benzene, such as styrene, and from 1 to 30% of a vinyl monomer containing a functional group adapted to cause cross linking upon heating. Suitable lower alkyl methacrylates and lower alkyl acrylates include the methyl, ethyl and propyl esters. The methacrylates and acrylates may be used alone or in combination. When an acrylic-based resin having a particularly high glass-transition temperature is desired, methyl methacrylate is used as the principal component.

Suitable vinyl benzenes include styrene, α-methyl styrene and the like. These compounds contribute to improved surface hardness of the resin coated layer, although an excessive amount will result in lowered weatherability. For this reason, an amount in excess of 50% is not desirable.

Suitable vinyl monomers containing a cross-linking functional group include vinyl monomers containing an epoxy-group, hydroxyl-group, carboxy-group, amino-group, and acid anhydrides, such as maleic anhydride and the like. One or more combinations of monomers of the two types, i.e., those which cause an addition reaction, such as a combination of an epoxy group and an hydroxyl group, and those which cause a condensation reaction, such as combination of an hydroxyl group and a carboxyl group may be used. The number of monomers of each type should be equal to one other. In addition, the monomer containing the functional group should be a component of the acrylic-based resin which is of a glassy state at room temperature, and such a monomer should be selected from derivatives of methacrylates or acrylates containing the aforesaid functional group, taking into consideration the copolymerization reaction of alkyl methacrylates or alkyl acrylates. Suitable derivatives of methacrylates or acrylates include 2-hydroxyethylmethacrylate which contains a hydroxyl group, glycidylmethacrylate which contains an epoxy-group, acrylamide which contains an amido-group, and methacrylic and acrylic acid. An isocyanate group or methylol group may be considered as functional groups adapted to cause cross-linking, although these groups are apt to cause premature cross-linking, because of their high activity. Thus care should be taken in the use of these groups. In addition, the functional group, which cuases the cross-linking due to a free radical reaction, is apt to cause cross-linking during the production of the acrylic-based resin, and thus the use of such active functional groups is not desirable.

Suitable rubbery material which form the dispersive portion of the resin composition are macromolecular materials with glass-transition temperatures below room temperature. However, the rubbery material should provide some degree of mutual solubility with the acrylic-based resin forming the matrix portion, so that the aforesaid rubbery material may be uniformly dispersed in fine granular form throughout the coated layer of the precoated metal and so that the coated layer will allow a high degree of plastic deformation. Thus suitable rubbery materials include acrylic rubbers containing methacrylates or acrylates with a relatively large alkyl group as the main ingredient thereof, or diene rubber graft polymerized with methacrylate, acrylate or vinyl benzene. By varying the copolymers in the acrylic rubbers, such as methyl methacrylate copolymerized with butylacrylate, or in rubbers in which methyl methacrylate or vinyl benzene has been graft-copolymerized with polybutadiene, the workability and surface gloss of the pre-coated metal may be widely varied.

The process for producing pre-coated metal according to the present invention includes the steps of: preparing an acrylic-based resin and a rubbery material; mixing the resin and rubbery material in the above suitable proportions; dissolving or swelling the components with a solvent; agitating the components sufficiently, thereby preparing the coating solution; applying the aforesaid coating solution onto the surface or surfaces of a metal sheet; and drying the coated sheet.

Suitable methods for preparing the acrylic-based resin and rubbery material include conventional emulsion polymerization, solution polymerization, bulk polymerization and the like.

However, care should be taken to avoid polymerization which involves high temperatures, because cross-linking reaction will be caused at the time of polymerization. In other words, two polymerization solutions, one containing the acrylic monomers and the other the monomers for the cross-linking are separately subjected to polymerization. After polymerization, the resulting resins are mixed together. Photo-polymerization, solution polymerization or emulsion polymerization is well adapted for use in the preparation of the acrylic-based resin and rubbery material of the present invention, because such processes require no heat and permit facile adjustment of the polymerization reaction temperature. In addition, prepolymers which are prepared by uniform solution-polymerization or by interrupting bulk polymerization half-way are advantageous for use, because they dispense with the step of dissolving the resins in a solvent, for preparation of a coating solution, because the resin component thereof has already been dissolved in a solvent or monomer.

If the acrylic-based resin or rubbery material is in a solid form the materials are dissolved into a ketone, toluene, xylene, or the like to prepare the coating solution. On the other hand, if the resin and rubbery material are in the form of a solution or prepolymer, the solvents or unreacted monomer may be used as the solvents for the coating solution. In this respect, the acrylic-based resin and rubbery material so prepared herein, may be used without further treatment for the resin coated layer of the pre-coated metal sheet. Additives, such as coloring agents, pigments, masking agents, resin stabilizers or the like may be added in this step, as necessary.

Other important considerations in the preparation of the coating solutions are the viscosity of the coating solution and the resin concentration. These two factors largely affect the efficiency of the subsequent coating and drying steps. The viscosity of the coating solution should preferably be 100 to 2000 poise at a temperature of 20°C, while the resin concentration should be from 20 to 50%. Viscosities and concentrations out of these ranges will result in lowered efficiency of the coating and drying steps.

The coating solution is preferably applied onto the surface of the metal sheet with a roll coating machine or a curtain flow coating machine. Suitable metal sheets useful for the present invention include steel sheets, aluminum sheets and the like. Their surfaces should be subjected to degreasing or pickling treatments prior to the application of the coating solution. Particularly, the pickling treatment enhances the formation of an irregular surface of the metal sheet, thereby increasing the bonding force between the metal sheet and the resin coated layer. On the other hand, it is recommended that a resin coating layer be applied to the surface of a metal sheet which has been subjected to a phosphating treatment for improving the adhesion force and corrosion resistance of the metal surface. If a strong bonding force is desired between the metal sheet and the resin coated layer, an epoxy-resin based or hard acrylic-resin based adhesive is preferably applied to the metal sheet. The thickness of the layer of the adhesive thus applied should not exceed several microns.

A heating and drying oven is used for evaporating solvents or unreacted monomers from the coating on the metal surface, thereby obtaining a coated layer having a structure, wherein a granular rubbery material is dispersed throughout the acrylic-based resin matrix. The metal sheet, whose surface has been treated with a coating solution, is transferred to a drying oven or a drying tunnel to be heated with hot air or infrared radiation, whereby the coating is dried. The temperature of the heating should not be so high as to cause cross-linking of the resin nor to cause boiling of the solvent or monomer which would result in the formation of bubbles therein. The evaporated solvent or monomer is transferred, by air pressure to a condenser or an absorbing tower for ultimate recovery.

The pre-coated metal sheets are delivered in the form of rolls or cut sheets to plants where they are cut into shapes close to those of the final products, and are then plastic worked, such as press-formed. The pre-coated metal sheet of the present invention will not exhibit cracking or cutting of the resin coated layer and a desired degree of plastic working may be applied to the base metal sheet. In addition, the pre-coated metal sheet can be both convexly and concavely deformed.

Suitable temperatures for the thermosetting treatment of the resin coated layer after plastic working are of the order of 150°C, and the treating time is preferably in the range of 10 to 40 minutes. Lower heat temperature require an excessively long period of time for the treatment. On the other hand, higher temperatures will shorten the treating duration, but will adversely affect the uniformity of the heated products and will lead to accompanying difficulties in controlling the system.

Having generally described the invention, a more complete understanding can be obtained by reference to certain specific examples, which are included for purposes of illustration only and are not intended to be limiting unless otherwise specified.

EXAMPLE 1

For preparing a solution of the acrylic-based resin, 148 g of methyl methacrylate, 37 g of butyl acrylate, 9.6g of 2-hydroxyethylmethacrylate, 5.4 g of acrylic acid and 1.0 g of benzoylperoxide, as a polymerization initiator, were dissolves in 390 g methylethylketone, and the mixture was placed in a flask equipped with agitator and filled with nitrogen gas to effect polymerization at a temperature of 70°C for 20 hours. The thus obtained viscous resin solution will be referred to as A 1. Part of the resin solution was poured dropwise into petroleum ether to effect precipitation, and the resin concentration and degree of polymerization were determined from the weight of dried precipitate. The resin concentration and polymerization degree of the resin solution were about 33% and 100%, respectively.

Similarly, for preparing a solution of rubbery material, 40 g of methylmethacrylate, 60 g of butylacrylate and 0.5 g of benzoyl peroxide as a polymerization initiator, were dissolved in 150 g methylethylketone, and the mixture was subjected to polymerization at a temperature of 70°C for 20 hours in the same manner as in the resin solution A 1, to prepare a rubber solution B 1. The resin concentration and polymerization degree of the rubber solution were determined to be about 25% and 90%, respectively.

Subsequently, 200 g of resin solution A 1 and 23 g of rubber solution B 1 were mixed to obtain a coating solution having a viscosity of about 400 poise. As such, the proportions of the acrylic-based resin and rubbery material were 92% and 8%, based on 100% of the total resin. The coating solution thus prepared was applied onto the surface of a base steel sheet 0.8 mm thick which was pickled and covered with about 3 $\mu$ of an epoxy based adhesive coating using a curtain flow coating machine. The steel sheet thus prepared was placed in a drying oven maintained at 70°C for 24 hours. There was thus obtained a pre-coated metal with a resin coated layer about 80 $\mu$ in thickness.

A granular rubber dispersive portion having an average particle size of 2 $\mu$ was observed to be uniformly dispersed in the resin coated layer in the pre-coated metal sheet. Furthermore, the hardness of the surface of the coated layer was H in terms of pencil core hardness. For testing the workability, an Erichsen value was obtained using an Erichsen tester having a punch 10 mm in diameter, while a du Pont value was obtained using a du Pont impact tester for determining the properties of the coated layer. (A du Pont test is one in which a ball of a given diameter is placed at rest on the surface of a coated sample, and then a given weight is dropped on the aforesaid ball from above in an attempt to damage the coated surface. The minimum height at which the surface of the sample causes breakage is measured.) The Erichsen value was found to be 10 mm. It is noteworthy that the value was obtained merely as a result of breakage of the base metal, since the resin coated layer could withstand the aforesaid Erichsen value.

The du Pont impact values obtained were in the range of 30 to 35 cm with a ball diameter of ¼ inch and weight of 500 grams. In addition, the pre-coated metal was subjected to a tight-or-contact-bending test, and produced no breakage of the resin coated layer. According to the above workability test, the pre-coated metal of this Example provided the same workability as conventional plastic pre-coated metal.

The pre-coated metal sheet of this example was press-formed to various shapes, such as cups, and then placed in an oven at a temperature of 150°C for 30 minutes, thereby setting the resin coated layer. This process increased the hardness of the resin coated layer to hardness 4 H, in terms of pencil core hardness. Incidentally, the hardness of the coated layer of conventional thermosetting pre-coated metal are H to 3 H, thus proving that the pre-coated metal of this invention affords excellent surface hardness compared with those of conventional pre-coated metal.

White parts were observed in the resin coated layer after being subjected to the press forming. However, such white parts disappeared by subjecting the layer to heat treatment at 150°C for 30 minutes, thus providing a glossy and hard coated layer.

EXAMPLE 2

In the preparation of a solution of acrylic-based resin, 400 g of methyl methacrylate, 100 g of butyl acrylate, 24 g of glycidyl methacrylate, as a functional group monomer, 14.5 g of acrylic acid, and 1.0 g of benzoin as a polymerization initiator were placed in a beaker. The top of the beaker was covered with a polyvinylidene chloride film and the mixture was exposed to sub-ultraviolet rays to effect photo-polymerization for about one and one-half hours. A viscous prepolymer (which will be referred to as a resin solution A 2) was obtained. During this photo-polymerization, the beaker was swung to agitate the polymerization solution. The resin concentration and viscosity of the resin solution obtained were 35% and about 500 poise, respectively.

Similarly, in the preparation of a solution containing rubber, 40 g of methyl methacrylate, 60 g of butyl acrylate and 0.2 g of benzoin as a polymerization initiator were placed in a beaker for photo-polymerization in the same manner as in the preparation of resin solution A 2, to obtain a prepolymer (which will be referred to as rubber solution B 2) with a resin concentration of 35% and viscosity of 400 poise.

A mixture of 270 g of resin solution A 2 and 30 g of rubber solution B 2 was prepared to obtain a coating solution. The coating solution thus obtained was applied to the surface of a steel sheet 0.8 mm in thickness using a curtain flow coating machine to a thickness of about 230 $\mu$. The surface of the steel had been first subjected to phosphating treatment before the application of the coating solution. The steel sheet thus coated was placed in an oven at 70°C for 24 hours to obtain a pre-coated metal sheet having a resin coated layer 80 $\mu$ in thickness.

The particle size of the granular rubbery material of the precoated metal of the present invention was about 3 $\mu$; the hardness of the surface of the layer was H in terms of pencil core hardness, and had an Erichsen value of 9.3 mm and a du Pont impact value of about 50 cm. In addition, no breakage in the resin coated layer was observed in the tightbending test, and substantially the same workability as that of the precoated metal given in Example 1 was noted. The pre-coated metal of this Example was subjected to heat treatment at 150°C for 25 minutes, and thereby the surface hardness of the resin coated layer was increased to 4 H.

EXAMPLE 3

In the preparation of a solution of acrylic-based resin, the above procedures were repeated, i.e., 400 g of methyl methacrylate, 100 g of butyl acrylate, 24 g of 2-hydroxyethyl methacrylate, 14 g of acrylic acid, and 1.0 g of benzoin were subjected to photo-polymerization. (This resin solution will be referred to as A 3). Similarly, in the preparation of a solution containing rubber, 38 g of methyl methacrylate, 62 g of butyl acrylate, 3 g of 2-hydroxyethyl methacrylate, 1.8 g of acrylic acid and 0.2 g of benzoin were subjected to photo-polymerization to obtain a prepolymer. (This will be referred to as resin solution B 3).

To prepare a coating solution 30 g of resin solution B 3 was added to 270 g of resin solution A 3, and 3 g of blue pigment, and 0.5 g of titanium white were added thereto with agitation. The coating solution was applied to a steel sheet of 0.8 mm thickness using a roll coating machine and the steel sheet thus prepared was subjected to heating and drying, thereby obtaining a pre-coated metal having a resin coated layer about 90 $\mu$ thick and obtaining rubbery material of about 1 $\mu$ diameter particle size. The surface hardness of the pre-coated metal was H in terms of pencil core hardness, and had an Erichsen value of 9.5 mm and du Pont impact value of about 40 cm. The pre-coated metal thus treated was placed in an oven at 150°C for 25 minutes, and the surface hardness of the resin coated layer obtained was increased to 4 H. The gloss of the surface of the coated layer subjected to heat treatment was 94 % in terms of mirror reflectance at 60°.

EXAMPLE 4

In the preparation of a solution containing an acrylic-based resin, 50 g of methyl methacrylate, 30 g of styrene, 20 g of lauryl methacrylate, 6.5 g of 2-hydroxyethyl methacrylate, and 4.3 g of methacrylic acid and $\alpha,\alpha'$-azobisisobutyronitrile as a polymerization initiator, were dissolved in 500 g toluene, after which the mixture was subjected to polymerization at a polymerization temperature of 80°C for 30 hours under nitrogen, thereby producing a viscous resin solution (referred to as resin solution A 4).

Similarly, for preparing a solution containing rubbery material, 15 g of methyl methacrylate and 15 g of lauryl methacrylate were dissolved in 100 g toluene for polymerization under conditions substantially the same as those of the previous example, thereby producing a viscous resin solution (referred to as a rubber solution B 4). To prepare the coating solution, 15 g of rubber solution B 4 was added to 285 g resin solution A 4. The coating solution was applied to the surface of a metal sheet to which had been applied an epoxy-acrylic based adhesive, followed by heating and drying, to obtain a pre-coated metal with a resin coated layer containing rubbery material of about 3 $\mu$ diameter particle size. The surface hardness of the pre-coated metal was found to be H in terms of pencil core hardness, and had excellent workability, withstanding a tight-bending test without breakage. The precoated metal was placed in a heating oven at 150°C for about 30 minutes and, as a result, the surface hardness of the resin coated layer of the pre-coated metal was increased to 5 H.

EXAMPLE 5

A mixture of 60 g of butadiene, 40 g of n-butyl acrylate, 1.0 g of sodium lauryl sulfate, 1.0 g of ammonium persulfate 0.4 g of sodium ammonium bicarbonate, 1.5 g of benzoyl peroxide and 150 g of water was prepared, and the mixture was placed in a closed polymerization apparatus equipped with an agitator to effect polymerization under nitrogen at 40°C for 10 hours, followed by the polymerization at 90°C for 7 hours, to obtain rubber latex A. Then, 85 g rubber latex A, 1.0 g of sodium lauryl sulfate, 0.07 g of potassium persulfate, 15 g of methyl methacrylate, 0.2 g of dodecyl mercaptan and 170 g of water were mixed and then the mixture thus prepared was subjected to polymerization at 70°C for 3 hours in the same manner as in the previous examples, thereby obtaining a polymer latex. The polymer latex was then subjected to solidification, cleaning and drying, and then dispersed in methyl ethyl ketone, to prepare resin solution with a concentration of 35%.

The resin solution corresponded to a solution containing rubbery material, and will be referred to as resin solution B 5.

To prepare a coating solution 30 g of resin solution B 5 was added to 200 g of resin solution A 1 prepared as in Example 1.

The coating solution was then applied to the surface of a steel sheet 0.8 mm in thickness, and the steel sheet was heated and dried to obtain a pre-coated metal with a coated layer containing a rubbery material of about 1 $\mu$ diameter particle size. The surface hardness of the resin coated layer of the pre-coated metal was H in terms of pencil core hardness and had workability which could withstand a tight-bending test. The surface hardness of the resin coated layer after heat treatment at 150°C for 30 minutes was 4 H.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a precoated metal sheet comprising a metal sheet and an acrylic resin coating, the improvement which comprises an acrylic resin coating comprising a dispersion of a granular rubbery material in an acrylic-based resin matrix which resin matrix contains monomer units having functional groups which cross-link upon heating and which resin matrix is glassy at room temperature, said resin coating comprising from 70 to 99 wt. percent of said acrylic-based resin matrix and from 1 to 30 wt. percent of said granular rubbery material.

2. The pre-coated metal sheet of claim 1, wherein the thickness of said acrylic resin coating is 20 to 200 $\mu$.

3. The pre-coated metal sheet of claim 1, wherein said monomer units range from 1 to 30 wt % of said resin matrix.

4. The pre-coated metal sheet of claim 1, wherein the acrylicbased resin matrix comprises 50 to 99% lower alkyl methacrylates and lower alkyl acrylates, 0 to 49 % vinyl benzene and 1 to 30% of a vinyl monomer containing a functional group which will cause cross-linking.

5. The pre-coated metal sheet of claim 4, wherein said vinyl monomer containing a cross-linking functional group is 2-hydroxyethylmethacrylate, glycidylmethacrylate, acrylamide, methacrylic or acrylic acid.

6. The pre-coated metal sheet of claim 1, wherein the rubbery material is selected from the group consisting of acrylic rubbers and diene rubbers.

7. The pre-coated metal sheet of claim 1, wherein the size of said granular rubbery material is 0.05$\mu$ to 15$\mu$ in diameter.

* * * * *